United States Patent
Isaev

(10) Patent No.: US 9,241,084 B2
(45) Date of Patent: Jan. 19, 2016

(54) SCANNING IMPLEMENTED SOFTWARE FOR TIME ECONOMY WITHOUT RESCANNING (S.I.S.T.E.R.) IDENTIFYING MULTIPLE DOCUMENTS WITH FIRST SCANNING PASS AND GENERATING MULTIPLE IMAGES WITH SECOND SCANNING PASS

(71) Applicant: ABBYY Development LLC, Moscow (RU)

(72) Inventor: Andrey Isaev, Moscow (RU)

(73) Assignee: ABBYY Development LLC (RU)

( * ) Notice: Subject to any disclaimer, the term of this patent is extended or adjusted under 35 U.S.C. 154(b) by 0 days.

(21) Appl. No.: 14/501,723

(22) Filed: Sep. 30, 2014

(65) Prior Publication Data

US 2015/0015922 A1    Jan. 15, 2015

Related U.S. Application Data

(60) Division of application No. 13/712,950, filed on Dec. 12, 2012, which is a continuation-in-part of application No. 13/662,044, filed on Oct. 26, 2012.

(51) Int. Cl.
*H04N 1/00* (2006.01)
*H04N 1/047* (2006.01)
*H04N 1/10* (2006.01)
*G06K 9/32* (2006.01)

(52) U.S. Cl.
CPC .......... *H04N 1/00681* (2013.01); *G06K 9/3275* (2013.01); *H04N 1/00748* (2013.01); *H04N 1/00758* (2013.01); *H04N 1/00774* (2013.01); *H04N 1/00809* (2013.01); *H04N 1/00816* (2013.01); *H04N 1/00819* (2013.01); *H04N 1/047* (2013.01); *H04N 1/10* (2013.01); *H04N 2201/0006* (2013.01)

(58) Field of Classification Search
None
See application file for complete search history.

(56) References Cited

U.S. PATENT DOCUMENTS

| | | | | |
|---|---|---|---|---|
| 4,314,159 A * | 2/1982 | Davis | | 358/496 |
| 4,370,641 A * | 1/1983 | Kantor et al. | | 382/289 |
| 4,875,104 A * | 10/1989 | Kamon | | 358/474 |
| 5,017,963 A | 5/1991 | Tuhro | | |
| 5,086,486 A * | 2/1992 | Yamada | | 382/291 |
| 5,159,667 A | 10/1992 | Borrey et al. | | |
| 5,228,099 A * | 7/1993 | Yamada | | 382/291 |
| 5,327,261 A * | 7/1994 | Hirota et al. | | 358/449 |
| 5,384,621 A * | 1/1995 | Hatch et al. | | 358/488 |
| 5,506,918 A * | 4/1996 | Ishitani | | 382/289 |
| 5,510,908 A * | 4/1996 | Watanabe et al. | | 358/464 |
| 5,528,387 A * | 6/1996 | Kelly et al. | | 358/488 |
| 5,669,007 A | 9/1997 | Tateishi | | |
| 5,784,487 A | 7/1998 | Cooperman | | |
| 5,818,976 A * | 10/1998 | Pasco et al. | | 382/289 |

(Continued)

*Primary Examiner* — Scott A Rogers
(74) *Attorney, Agent, or Firm* — LeighAnn Weiland; Veronica Weinstein

(57) ABSTRACT

Methods and devices are described for detecting boundaries of documents on flatbed and multi-function scanners on a first pass of a carriage assembly, and then performing a high resolution scan on a second pass. High resolution images of documents can then be obtained with little or no interaction normally necessary to identify areas of interest on the scanner bed. Patterns on the scanner cover or lid facilitate not only edge determination, but orientation of text and other objects, and straightening of images in preparation for OCR and related functions. Electronic images and files derived from paper documents may be automatically cropped, deskewed, subjected to OCR, and named consistent with content or other information derived from them.

22 Claims, 9 Drawing Sheets

(56) References Cited

U.S. PATENT DOCUMENTS

| | | | |
|---|---|---|---|
| 5,900,950 A * | 5/1999 | Hsu | 358/497 |
| 5,912,448 A * | 6/1999 | Sevier et al. | 358/488 |
| 5,926,823 A | 7/1999 | Okumura et al. | |
| 5,937,084 A | 8/1999 | Crabtree et al. | |
| 5,940,544 A * | 8/1999 | Nako | 382/289 |
| 6,111,244 A | 8/2000 | Wang | |
| 6,185,011 B1 | 2/2001 | William | |
| 6,208,438 B1 * | 3/2001 | Watanabe et al. | 358/488 |
| 6,229,630 B1 | 5/2001 | Kim | |
| 6,377,704 B1 | 4/2002 | Cooperman | |
| 6,388,778 B1 | 5/2002 | Ko-Chien | |
| 6,430,320 B1 * | 8/2002 | Jia et al. | 382/289 |
| 6,433,896 B1 * | 8/2002 | Ueda et al. | 358/488 |
| 6,556,721 B1 | 4/2003 | Wang et al. | |
| 6,574,375 B1 * | 6/2003 | Cullen et al. | 382/288 |
| 6,636,649 B1 * | 10/2003 | Murata et al. | 382/296 |
| 6,694,053 B1 | 2/2004 | Burns et al. | |
| 6,922,697 B1 | 7/2005 | Suehira | |
| 7,006,708 B1 * | 2/2006 | Nako et al. | 382/294 |
| 7,085,012 B2 * | 8/2006 | Schweid et al. | 358/3.26 |
| 7,157,910 B2 | 1/2007 | Van Den Brink | |
| 7,277,579 B2 | 10/2007 | Huang | |
| 7,305,613 B2 | 12/2007 | Oezgen | |
| 7,370,059 B2 | 5/2008 | Geraud | |
| 7,392,473 B2 | 6/2008 | Meunier | |
| 7,397,587 B2 * | 7/2008 | Os et al. | 358/474 |
| 7,457,012 B2 * | 11/2008 | Fang | 358/488 |
| 7,675,021 B2 | 3/2010 | Lapstun | |
| 7,764,408 B2 * | 7/2010 | Ohama et al. | 358/488 |
| 7,831,098 B2 | 11/2010 | Melikian | |
| 7,839,543 B2 * | 11/2010 | Watanuki | 358/474 |
| RE42,234 E * | 3/2011 | Chiu | 358/474 |
| 8,064,729 B2 * | 11/2011 | Li et al. | 382/289 |
| 8,174,737 B2 * | 5/2012 | Kato et al. | 358/474 |
| 8,189,961 B2 * | 5/2012 | Nijemcevic et al. | 382/289 |
| 8,259,370 B2 * | 9/2012 | Iwatsuka | 358/509 |
| 8,260,049 B2 | 9/2012 | Deryagin et al. | |
| 8,270,044 B2 * | 9/2012 | Seo | 358/488 |
| 8,452,132 B2 | 5/2013 | Isaev et al. | |
| 8,520,266 B2 * | 8/2013 | Elliot et al. | 358/474 |
| 8,553,280 B2 * | 10/2013 | Hoover et al. | 382/289 |
| 8,649,052 B2 * | 2/2014 | Hoover et al. | 358/1.18 |
| 8,873,111 B2 * | 10/2014 | Sakai et al. | 358/474 |
| 2004/0264774 A1 | 12/2004 | Anisimovich et al. | |
| 2006/0071392 A1 | 4/2006 | Shyu | |
| 2006/0235855 A1 | 10/2006 | Rousseau et al. | |
| 2006/0268346 A1 | 11/2006 | Van Os | |
| 2006/0282442 A1 | 12/2006 | Lennon et al. | |
| 2006/0290789 A1 * | 12/2006 | Ketola | 348/231.2 |
| 2007/0019255 A1 * | 1/2007 | Sakakibara et al. | 358/505 |
| 2007/0253031 A1 * | 11/2007 | Fan | 358/1.18 |
| 2007/0273935 A1 * | 11/2007 | Ide et al. | 358/474 |
| 2007/0285739 A1 | 12/2007 | Nakano et al. | |
| 2009/0067005 A1 * | 3/2009 | Chelvayohan et al. | 358/2.1 |
| 2009/0087094 A1 | 4/2009 | Deryagin et al. | |
| 2009/0323131 A1 * | 12/2009 | Toyoda | 358/448 |
| 2010/0002273 A1 | 1/2010 | Schmidt et al. | |
| 2010/0215272 A1 | 8/2010 | Isaev et al. | |
| 2010/0271646 A1 * | 10/2010 | Morimoto et al. | 358/474 |
| 2011/0085198 A1 * | 4/2011 | Son et al. | 358/403 |
| 2011/0181920 A1 * | 7/2011 | Kim | 358/474 |
| 2011/0216378 A1 * | 9/2011 | Poon et al. | 358/474 |
| 2013/0054595 A1 | 2/2013 | Isaev et al. | |
| 2013/0063789 A1 * | 3/2013 | Iwayama et al. | 358/449 |
| 2013/0268528 A1 * | 10/2013 | Kawano | 707/736 |

* cited by examiner

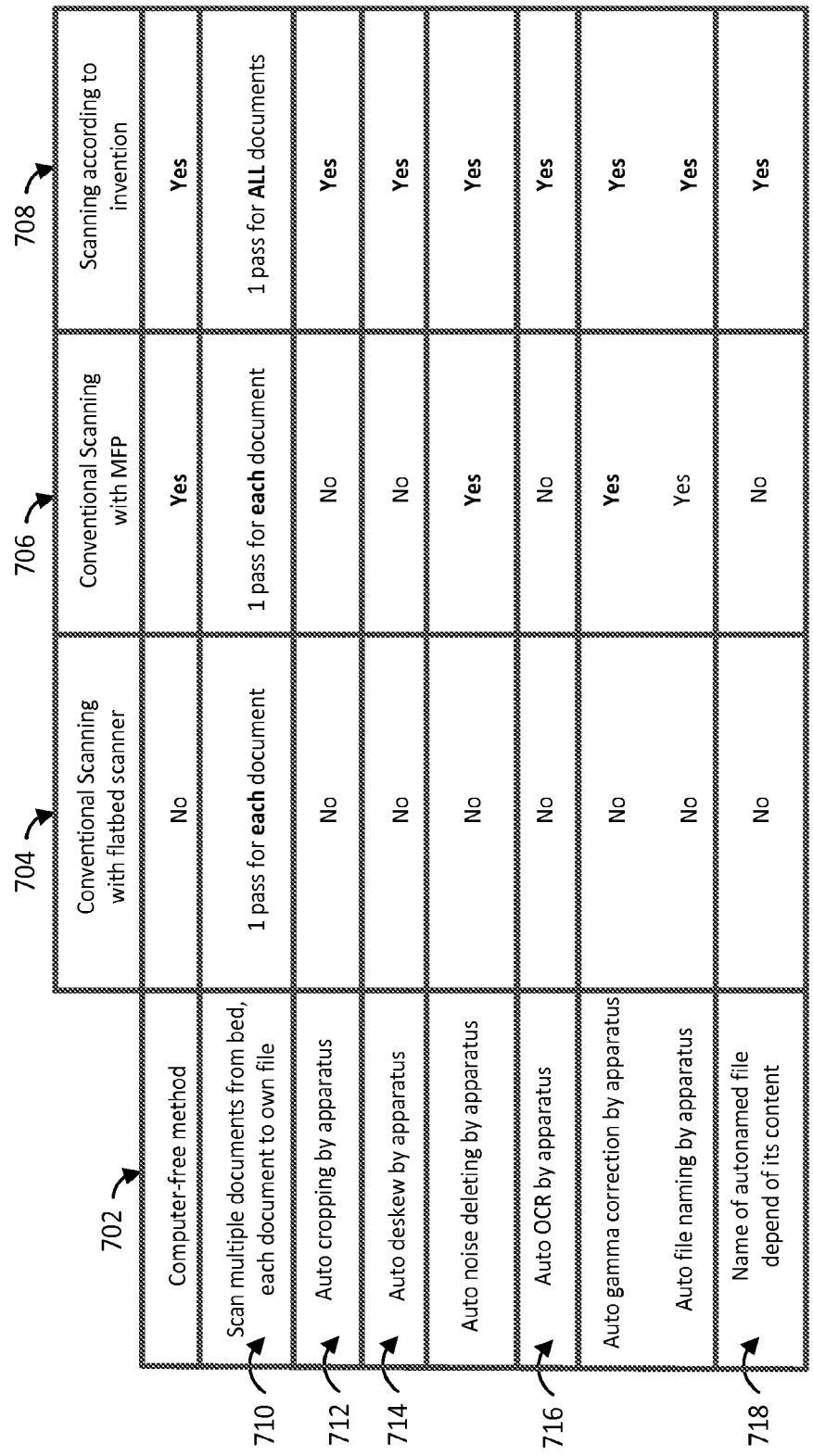

FIG. 7

| | Conventional Scanning with flatbed scanner | Conventional Scanning with MFP | Scanning according to invention |
|---|---|---|---|
| Computer-free method | No | Yes | Yes |
| Scan multiple documents from bed, each document to own file | 1 pass for each document | 1 pass for each document | 1 pass for ALL documents |
| Auto cropping by apparatus | No | No | Yes |
| Auto deskew by apparatus | No | No | Yes |
| Auto noise deleting by apparatus | No | Yes | Yes |
| Auto OCR by apparatus | No | No | Yes |
| Auto gamma correction by apparatus | No | Yes | Yes |
| Auto file naming by apparatus | No | Yes | Yes |
| Name of autonamed file depend of its content | No | No | Yes |

SCANNING IMPLEMENTED SOFTWARE FOR TIME ECONOMY WITHOUT RESCANNING (S.I.S.T.E.R.) IDENTIFYING MULTIPLE DOCUMENTS WITH FIRST SCANNING PASS AND GENERATING MULTIPLE IMAGES WITH SECOND SCANNING PASS

CROSS-REFERENCE TO RELATED APPLICATIONS

This application is a divisional of U.S. patent application Ser. No. 13/712,950, filed Dec. 12, 2012, which is a continuation in part of U.S. patent application Ser. No. 13/662,044, filed Oct. 26, 2012. This application also claims the benefit of priority under 35 USC 119 to Russian Patent Application No. 2014137823, filed Sep. 18, 2014; the disclosure of the priority applications are incorporated herein by reference.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette Mar. 18, 2003. The Applicant has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but points out that the designations are not to be construed as commentary or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND OF THE INVENTION

1. Field

The present invention relates to functions traditionally associated with converting printed papers into electronic images for processing or storing within a computer system. Flatbed scanners and multifunctional devices (MFP's) are frequently used for performing this task. Embodiments of the invention relate particularly to improving scanning speeds and reducing the number of required scanning passes to process documents or other items.

2. Related Art

A document processed by optical character recognition (OCR) is initially and usually presented as an electronic image. A printed picture to be stored in a computer system is also initially and usually presented as an electronic image. Such pictures are usually obtained from a flatbed scanner or multi-function printer and scanner (MFP).

The flatbed scanner or MFP usually includes a carriage assembly that transforms a luminous flux into an electronic image, a stepping motor assembly moving carriage, and a main electronic board that forms and processes the electronic image and possibly sends the electronic image to the computer system through an interface cable, a local network cable, or wireless across a network via one or more network protocols.

FIG. 1 shows an example of a conventional scanner 100 according to the known art and exemplifies a typical scanning operation of a paper document 102. With reference to FIG. 1, a scanner 100 includes a scanning base 104 and glass plate or bed 106 on which is placed one or more paper documents 102. A hinged cover or lid 108 is placed over the documents 102. The cover 108 includes a uniformly solid white or solid black background 110 for the working area of the scanner. In operation, the lid 108 is closed.

When a user works with a flatbed scanner, the user first triggers a preview to see where the paper documents exist on the bed 106 of the apparatus 100. It is necessary to see how these papers or documents 102 are located on the bed 106 and the user manually selects or indicates one or more scanning areas. During a preview the scanner moves its carriage (not shown) quickly, from front to back of the bed 106 or base 104, from a starting position to an end position. At this point, during the preview, a lamp on the carriage is on. The apparatus performs the scanning and makes an electronic image of a substantially low resolution. Next, the carriage returns back to its starting position. On its way, in order to preserve lamp life and to reduce power consumption, the lamp on the carriage is turned off, and scanning is not performed. A preview image is sent to an associated computer.

Next, the user views a result of the preview on a screen of the computer associated with the scanner. The user selects one or more scanning areas and initiates a scan, typically with high resolution, to get an electronic image of sufficient quality to perform OCR, to store it as an electronic file, to print it, to send it by email, etc.

When the scanner 100 scans with high resolution, it moves its carriage again from the front to the back of the bed 106, but now this time slowly. The lamp is turned on and the scanner performs the scanning and makes one or more electronic images with a relatively high resolution or resolution that is higher than the preview scan. Next, the carriage returns back again to an initial position. In the case where a user has two or more papers for scanning on the scanner bed 106, the user is required to start scanning with a fresh or uninitiated scanning area—the scanner 100 has no way to detect where the next paper document is placed on the bed 106 or the dimensions or orientation of the paper document(s) freshly loaded onto the scanner bed 106. After another initial scan, the user again must select one or more areas for a high resolution scan before he can capture electronic images.

Consequently, users are required to operate the scanner twice per document: a preliminary scan first and then a scan at high resolution second. Also, users generally must have a computer connected or associated with the scanner in order to control the scanner and the scanning process to acquire scanned images.

On the side of the associated computer, for a collection of images, a user is required to open each image successively with the assistance of an image editing software program. The user must manually crop, deskew, remove digital noise, correct a gamma value, invent a name for the file and initiate a save operation to persist the image as a computer file. Such scenario is repeated millions of times every day. Such scenario is tedious and ripe for automation.

FIG. 5A shows a flowchart of a method 500A for scanning documents with a flatbed scanner in accordance with a known methodology. With reference to FIG. 5A, a user places one or more documents on the bed of a scanner 502. In FIG. 5A, the symbol of a bust 503 indicates that a user typically performs this step manually. The user next presses or selects a preview button 504. A scanner's carriage is activated and moves forward along the bed of the scanner; the scanner scans its bed and captures a (low-resolution) image 506. Next, a document area is defined automatically or programmatically 508. The carriage returns (backward) to a start position 510. A low resolution image is transferred to an associated computer 512. A preview image is displayed 514 on a display that is associated with the computer. An initial border or area is identified for any documents in the image captured by the first scan. One or more areas for further scanning are manually selected 516. Such selection is based upon the first image or preview image returned from the scanner. Next, a user selects a scan button 518 or corresponding software element to initiate a final or non-preview scan.

In response, the scanner performs a (high resolution) scan of all selected areas 520. Images or files are sent to the associated computer 522. The user usually opens the images in an image editor 524—at least to confirm that images of sufficient quality were captured. The user serially works through the captured images such as by choosing a next image 526. Often, the user optionally and manually crops images captured at the higher resolution 528, manually deskews the images 530, manually removes noise from the images 532, and manually corrects the gamma value associated with the images 534. Next, a user must invent a filename for each file 536, and save each file in an electronic store 538. The user typically works through the images sequentially until each image is saved. When the image is the last one 540, the user closes the image editor 542 and further manually processes the saved images 544 such as by performing OCR on one or more of the images, sending the images via an email client, printing the images, and sharing the images through a social networking website.

If a user works with an MFP, he cannot perform a preview. In this case, the user selects a functional button on the MFP, for example a button or menu selection corresponding to "Scan to folder" or "Scan and E-mail." Also, the user usually must adjust or select one or more settings of the MFP. For example, the user must select a destination folder on the local network or set an e-mail address, required settings associated with the previously mentioned functions.

Typically, when a functional button is pressed by a user, the MFP moves its carriage from the front to the back of the bed with a lamp on the carriage turned on. The MFP apparatus scans its entire bed area and makes one electronic image at high resolution. Next the carriage returns back to its initial position. At this point, the lamp on the carriage is turned off, and scanning ceases.

In this scenario, the user does not have an opportunity to review an initial scan, preview the results of the MFP scanning, or select an area different from the entire bed of the MFP for scanning Instead, he must go to his computer to view the scanned image that has been saved or emailed by the MFP. Upon viewing this image, the user can then optionally crop, deskew, OCR or perform other operations on the image. However, if the scanning were of a book, and the scanning fails to capture the appropriate usable portion of the paper document, the user must again return to the MFP to again perform scanning FIG. 5B shows a flowchart of a method 500B for scanning documents with a multifunctional device or multifunctional printer (MFP) in accordance with a known methodology. With reference to FIG. 5B, a user places one or more documents on the bed or feeder of the MFP 552. The user next presses or selects a function button 554. A scanner's carriage is activated and the scanner (or associated computer) captures a high-resolution image 556. Next, the carriage returns (backward) to a start position 558. A generally high resolution image is saved to local internal electronic storage location, the image being saved with a default or generic serialized name 560. The image or file is transferred 562 according to the function associated with the function button that was previously selected. Next, a user goes to a computer such as a personal computer or computer electronically connected to the MFP 564. A user is required to find the file on a local hard disc or other file location such as in a network shared folder associated with an account of the MFP 566. The user next must determine if a particular file is the image or set of images corresponding to the paper documents that she placed on the MFP initially 568.

When found, the user usually opens the images in an image editor 570—at least to confirm that images of sufficient quality were captured. Often, the user optionally and manually crops images 572, manually deskews the images 574, manually removes noise from the images 576, and manually corrects a gamma value associated with the images 578. The user may close the image editor 580. Next, a user must invent a filename for each file 582 such as based on its content, and save each file according to its invented filename in an electronic store 584. The user typically works through the images sequentially until each image is saved. When finished naming the files, a user may further manually process the saved images such as by performing OCR on one or more of the images, sending the images via an email client, printing the images, and sharing the images through a social networking website.

Accordingly, there is substantial opportunity to improve the highly manual process of scanning paper documents and working with images of such documents.

SUMMARY

Methods and devices are described for detecting boundaries of documents on flatbed and multi-function scanners on a first pass of a carriage assembly, and then performing a high resolution scan on a second pass. High resolution images of documents can then be obtained with little or no interaction normally necessary to identify areas of interest on the scanner bed. Patterns on the scanner cover or lid facilitate not only edge determination, but orientation of text and other objects, and straightening of images in preparation for OCR and related functions. Certain functions such as functions related to OCR may be automated. For example, images and electronic files derived from paper documents may be automatically cropped, deskewed, OCR'd and named consistent with content or other information derived from paper documents.

Any of a variety of patterns may be useful when applied to a scanner cover or lid. A pattern may be an image that includes one or more fragments or cyclically repeated designs or patterns. For example, a pattern may be a regular grid formed with uniform lines, a set of stripes running parallel with the scanner bed, two sets of parallel lines, a set of unevenly spaced lines, and a series of dashes, dots or one or more other shape arranged in a variety of configurations.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings. Throughout, like numerals refer to like parts with the first digit of each numeral generally referring to the figure which first illustrates the particular part.

FIG. 7 shows a table illustrating differences between conventional scanning techniques and scanning according to an embodiment of the invention.

DETAILED DESCRIPTION

Broadly, embodiments and techniques of the present invention disclose or relate to methods for reducing time, resources and power associated with operation of a scanner or multi-function printer (MFP) or other device with scanning/image-capture capability when capturing images from paper documents. Further, certain functions may become automated.

Figure 1:
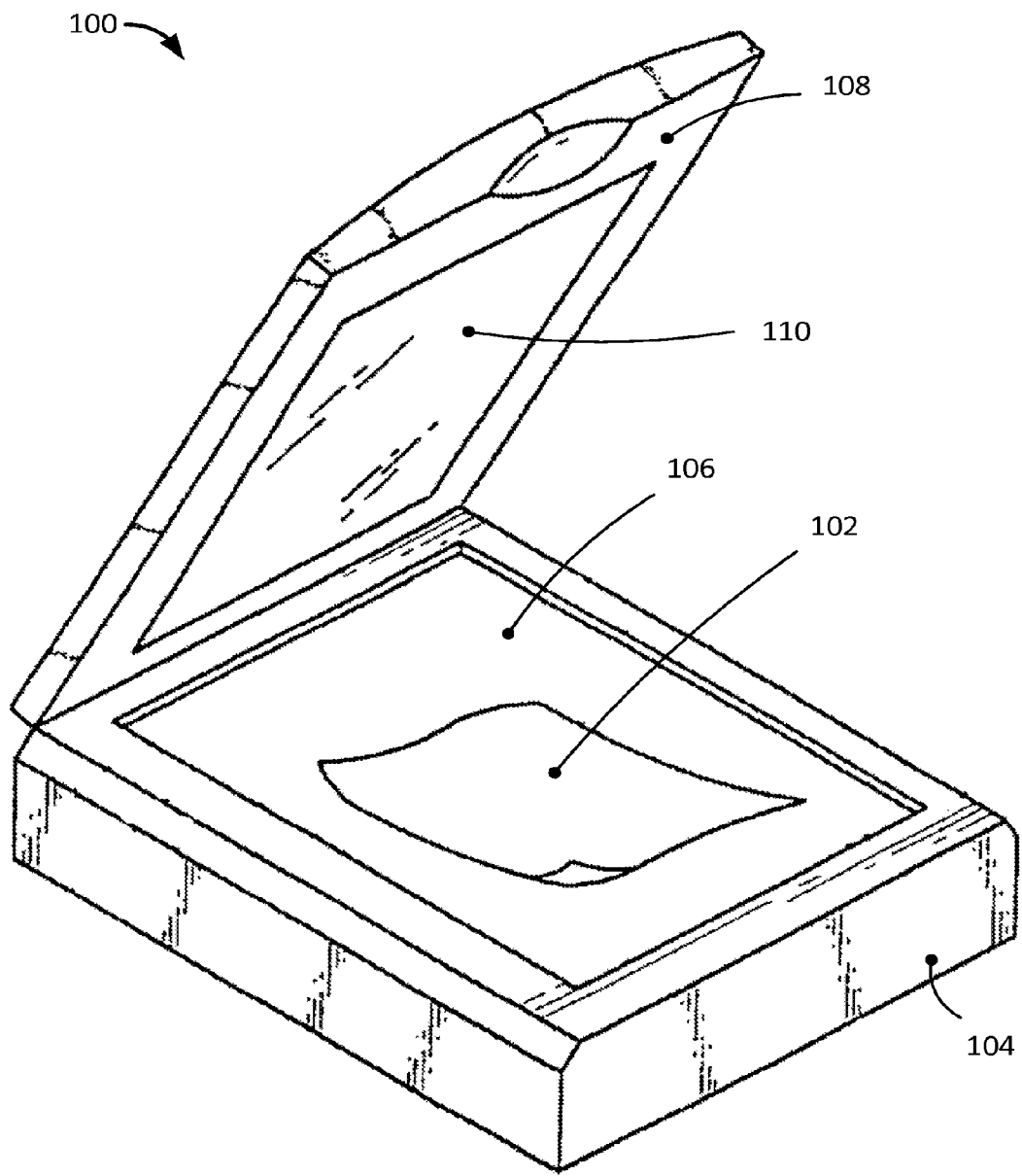
FIG. 1 is a perspective view of a flatbed scanner according to the known art.
Figure 2:
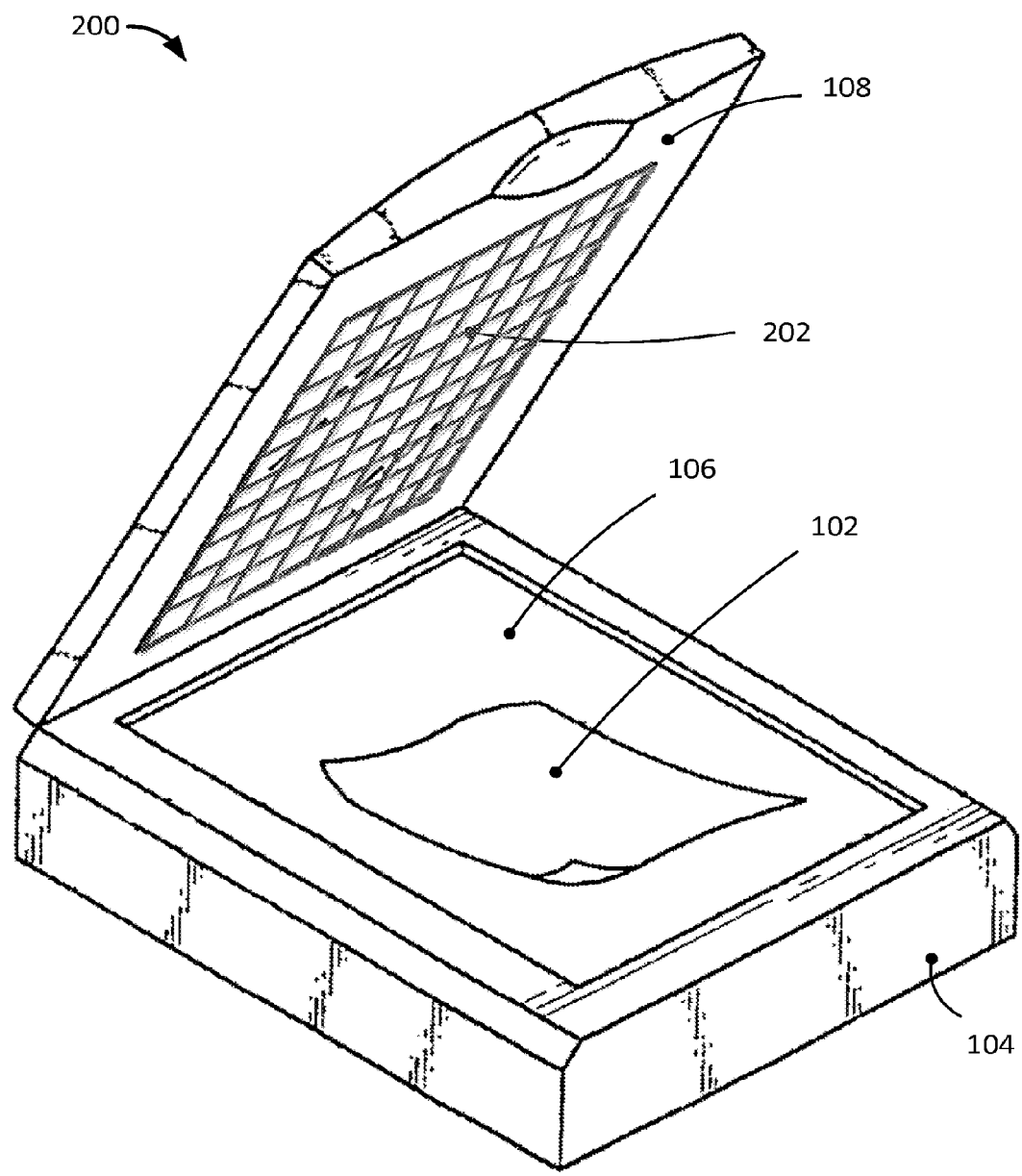
FIG. 2 is a perspective view of a flatbed scanner according to one implementation of the invention for flatbed scanners.

FIG. 2 shows an example of a scanner 200 according to one implementation of the invention for scanning one or more paper documents 102. With reference to FIG. 2, a scanner 200 includes a scanning base 104, glass plate or bed 106 and cover or lid 108. This cover 108 includes a background 202 that includes a pattern, texture or design instead of a uniformly solid white or solid black background. In operation, the cover 108 is preferably closed. The background 202 provides features for more intelligently performing scanning operations.

Figure 3:
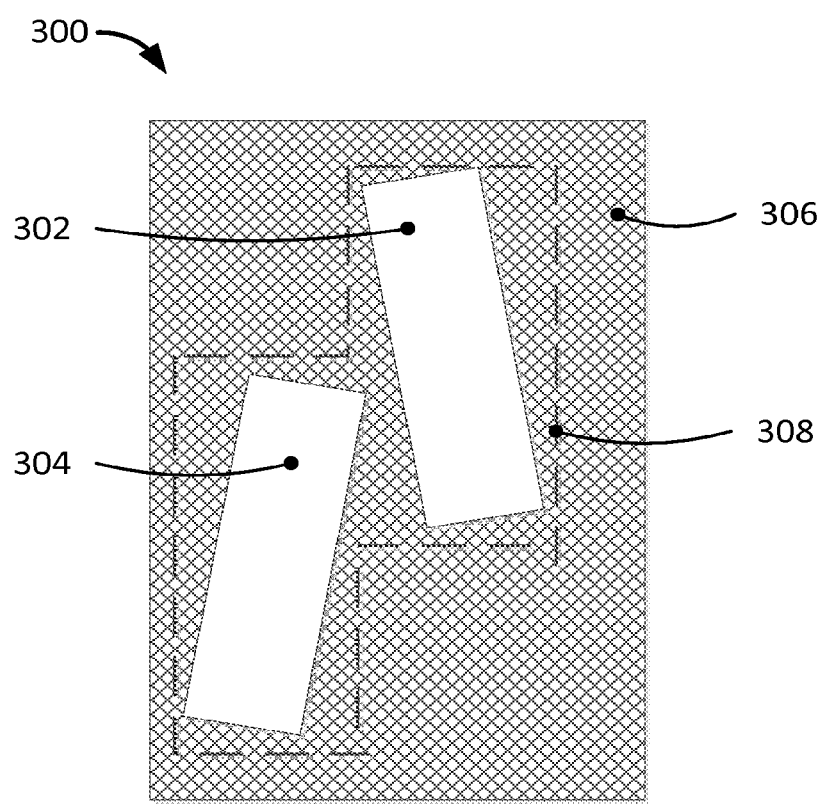
FIG. 3 shows a diagram illustrating documents (e.g. checks, business cards) lying on a bed of a flatbed scanner such as the one illustrated in FIG. 2.

FIG. 3 shows a diagram illustrating documents (e.g. checks, business cards) lying on a bed of a flatbed scanner such as the one illustrated in FIG. 2. With reference to FIG. 3, there are 2 discreet representations of documents 302, 304 that are on the bed 106. Also, there is a patterned background 306 behind and outside of any portion of the document(s) on the bed of the scanner. For illustration purposes only, the document representations 302, 304 are shown as blank. Similarly, for purposes of illustration, the patterned background 306 is shown with a somewhat uniform pattern. However, as described in more detail herein, such is not a requirement of the patterned background 306. In practice, the documents represented as 302, 304 may be any paper or other type of physical document or object that is amenable to a scanner 200. The documents 302, 304 are shown askew on the bed 106 and illustrate that the invention operates on documents at an arbitrary alignment or orientation relative to the bed of the scanner. The scanner 200 or associated computer (not shown in FIG. 3) may be programmed so as to identify a cropped region 308 around one document representation 302, both document representations 302, 304 or around the document representations 302, 304 individually even though the document representations 302, 304 may overlap each other along a vertical line.

In operation, the scanner 200 performs an initial scan across the bed 106 such as at a low resolution. Such an initial scan can be accomplished quickly. Immediately afterward, the scanner 200 can acquire or identify a cropped region 308. Then, instead of waiting for a further interaction with a user, the scanner 200 or associated computer (i.e., software or portion of the operating system active on the associated computer) can immediately perform a high resolution or second scan of the image using information, pattern or data derived from the patterned background 306. The carriage of the scanner (not shown) is not even required to return to an initial position. A single (round trip) pass—forward and backward—of the scanner 200 can yield high resolution images or images prepared for further processing without manual input from a user. After the initial pass, and after identifying regions of interest, the scanner 200 can scan one or more areas such as the cropped region 308 that likely includes one or more documents destined for capture or scanning In post processing, a user or set of program instructions can then crop and perform other actions on the high resolution image or images.

Figure 4:
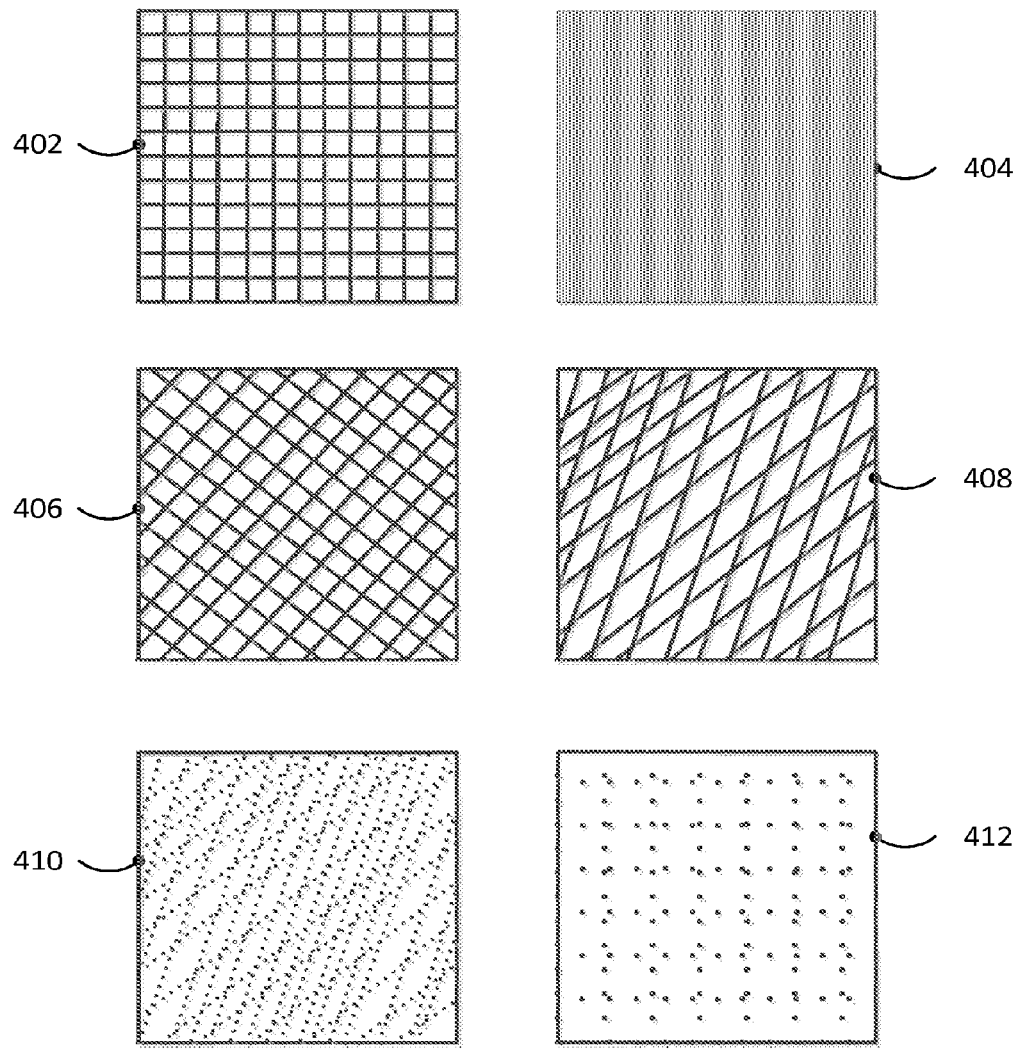
FIG. 4 shows a variety of patterns for a lid, cover or background for a scanner in accordance with various embodiments of the invention.

FIG. 4 shows a variety of patterns for a lid, cover or background for a scanner in accordance with various embodiments of the invention. With reference to FIG. 4, according to one implementation, the pattern is an image that includes one or more fragments or cyclically repeated designs or patterns. For example, a pattern may be a regular grid 402 formed with uniform lines running perpendicular to each other and oriented squarely with a scanner bed (not shown in FIG. 4). In another implementation, the pattern may be a set of finely printed dots 404.

In another implementation, the pattern is a set of lines forming a regular grid oriented at an arbitrary angle with respect to the scanner bed (406). In yet another exemplary implementation, the pattern is formed with two sets of parallel lines 408 where the lines of each set are parallel with each other, but are not spaced evenly. Further, each set of lines is set at an arbitrary angle with respect to the other set of lines. In yet another implementation, the pattern may be a series of dashes, dots, points, crosses, circles, angles and/or other shape(s) 410 arranged according to one or more directions or generally along one or more sets of lines or other shape. In another exemplary implementation, the pattern is formed by a random or semi-random set of shapes (e.g., dots, dashes, squares, rectangles) arranged somewhat sparsely across the scanner lid 108. In yet another exemplary implementation, the pattern includes dashes, dots, points, crosses, circles, angles and/or other shape(s) arranged at a higher density toward a middle region (radially or linearly) of the scanning surface relative to an outer edge or region of the scanning surface. In such implementation, program instructions can determine a document position relative to the scanning surface.

In general, the pattern may be formed consistent with any checked paper, cross-hatched paper or lined paper. All the elements of a pattern can be in one color or different colors. The elements can be printed, applied with paint, applied to a scanner cover or lid with glue or in any other way, or formed into the plastic, metal or other material of the scanner cover or lid. The pattern may be part of a separate plate or sheet that is placed on top of or behind the items to be scanned.

Figure 5A:
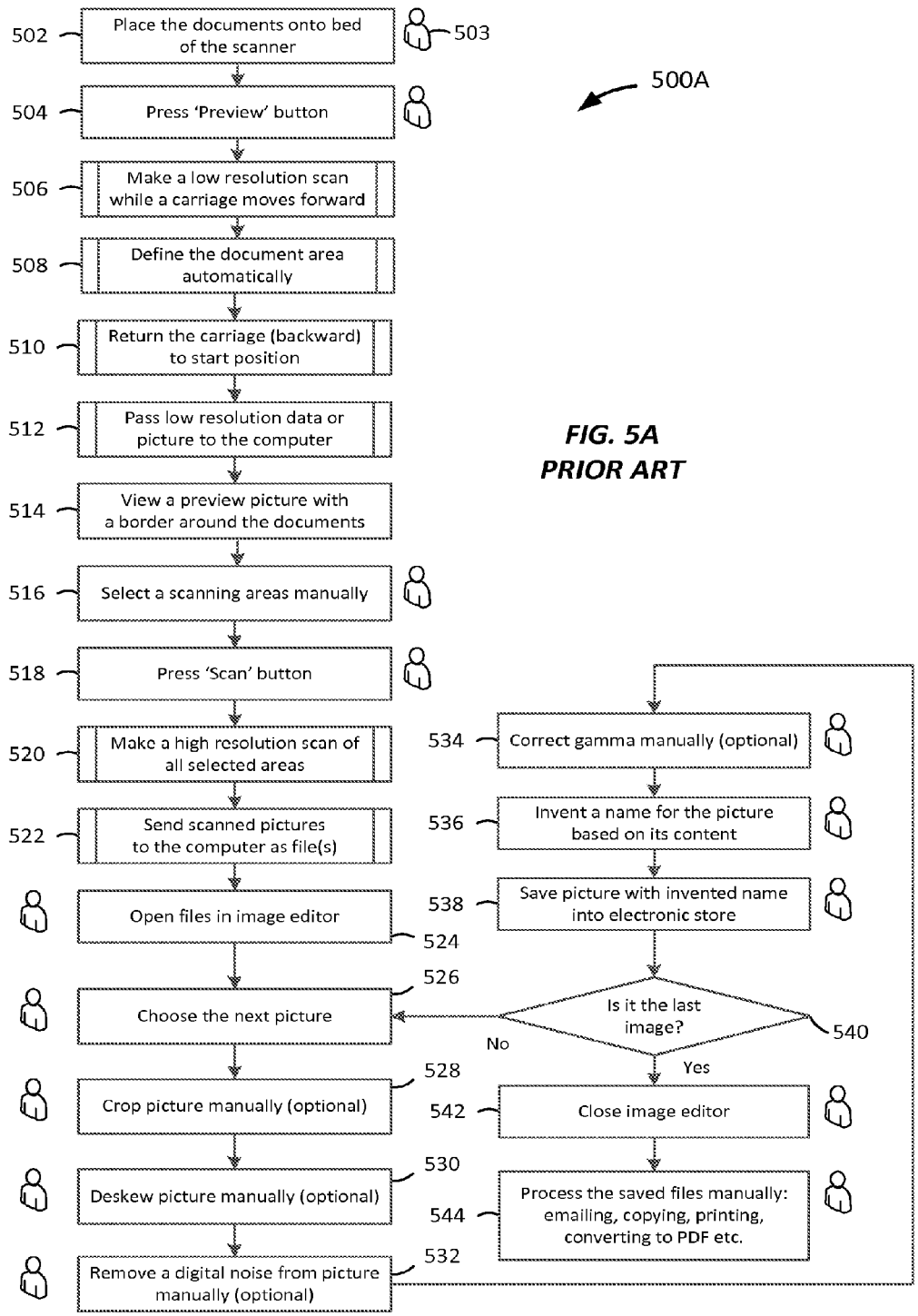
FIG. 5A shows a flowchart of a method for scanning documents with a flatbed scanner in accordance with a conventional methodology.
Figure 5B:
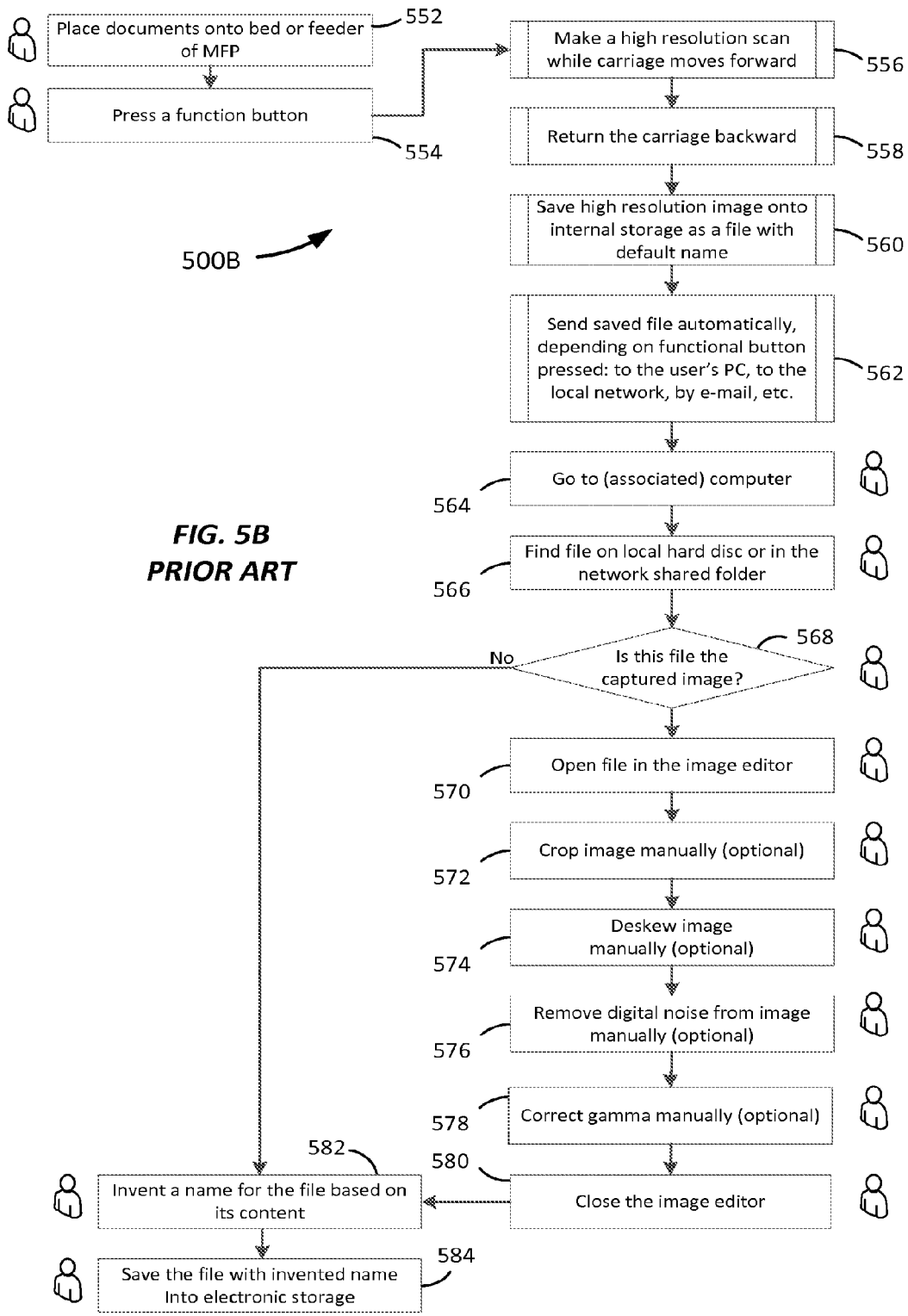
FIG. 5B shows a flowchart of a method for scanning documents with a multifunctional device or multifunctional printer (MFP) in accordance with a conventional methodology.
Figure 6:
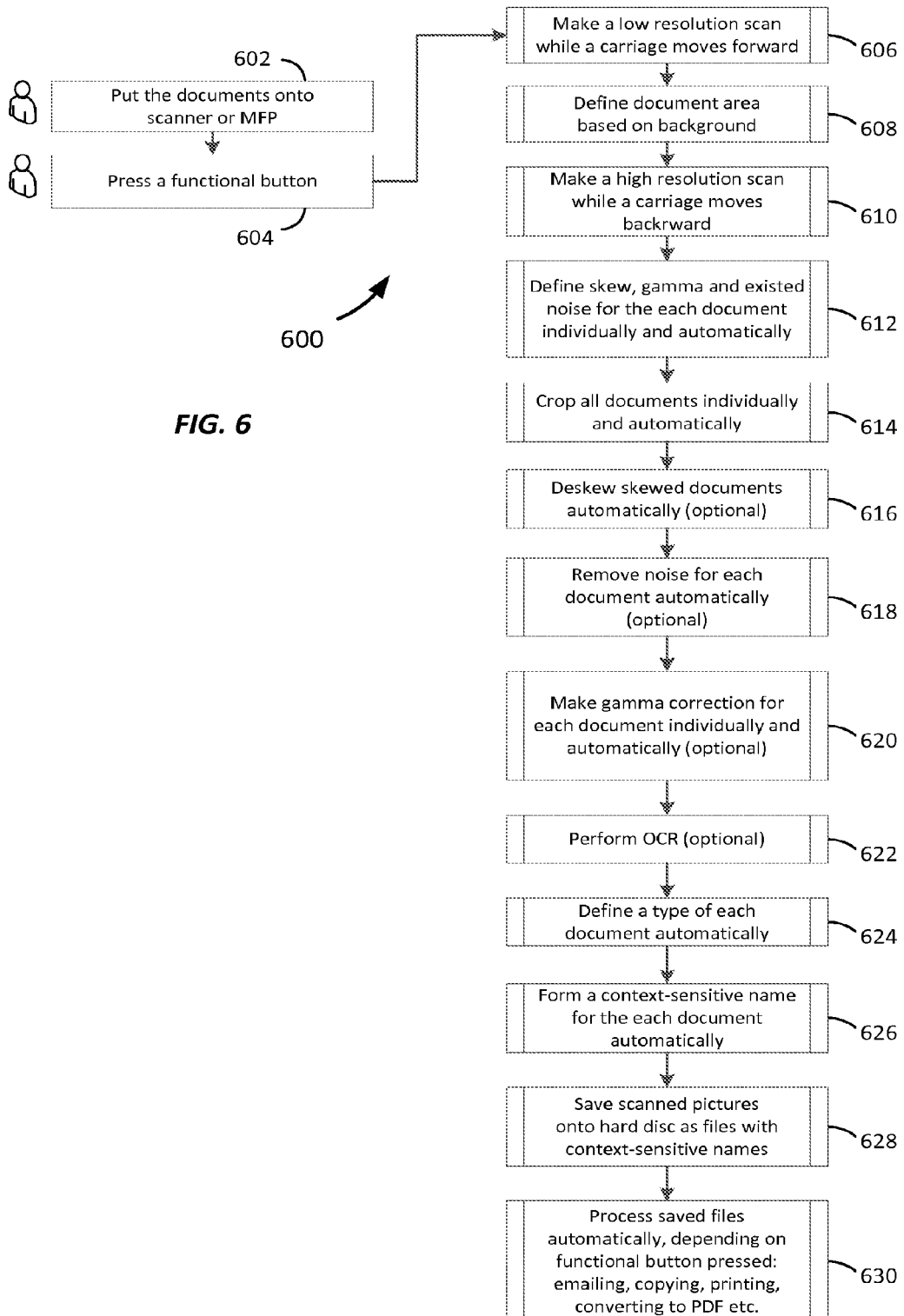
FIG. 6 shows an exemplary implementation of a method for scanning a document according to an embodiment of the invention.

In contrast to FIG. 5A and FIG. 5B, FIG. 6 shows an exemplary implementation of a method for scanning a document according to an embodiment of the invention. In this embodiment, at step 602 a user first puts one or more papers or documents onto the bed of a scanner or MFP. The user then selects a functional button at step 604, for example a "scan" button. The scanner makes a low resolution scan as its carriage moves in a first or forward direction at step 606. The scanner or associated computer (or combination of scanner and associated computer) automatically (programmatically) determines or defines an area of interest or document area at step 608. During capture of the low resolution scan of the scanner bed, a fine detection of a document's shape, size and coordinates may be performed using software or instructions implemented in MFP, scanner and/or associated computer. Such processing may be performed during the step that is traditionally associated with preview scanning while the carriage of the MFP or scanner moves forward. Thus, to a user, there is little or no delay since the MFP or scanner must mechanically perform steps associated with image capture anyway.

As the carriage moves in a second, return or backward direction, the scanner captures or makes a high resolution scan at step 610. Next, skew angle, gamma and noise are automatically or programmatically determined for each document. All images corresponding to documents on the scanner are optionally and automatically cropped at step 614. Any existing skew is optionally and automatically adjusted at step 616. Noise from each document image is optionally and automatically adjusted or removed at step 618. Gamma corrections are optionally and automatically made for each document at step 620. Moreover, all of these operations 614, 616, 618, 620 can be performed for each document independently. For example, a first document can be processed with gamma 1.2 and noise removal. At the same time, a second document can be processed with gamma 1.05 and with no noise removal.

In a preferred implementation, optical character recognition (OCR) is performed on images that include text in the image at step 622. This step is optional, but is a precursor to other functions. Based on one or more characteristics of the images, each image or portion thereof is automatically associated with a type at step 624. For example, a document on the scanner may be determined to be a check based on, for example, certain characteristics such as a check number in one corner region and a signature block near one edge region.

At step 626, a context-sensitive name for each image is automatically generated. Such name may be derived from text recognized in the image. Each image is saved as one or more computer file automatically at step 628. Subsequently, one or more other functions may be automatically performed at step 630. For example, images from documents on the scanner may be sent over an email protocol to one or more email addresses. As another example, non-text-based images may be additionally saved in a raw or uncompressed format, and text-based documents may be saved as PDF files. As a third example, a first document can be classified as text, recognized and saved as a PDF file with a text layer. At the same time, a second document can be classified as a color photo and saved as JPG-encoded file that has not been subjected to character recognition. One benefit of this method includes scanning of all documents on the scanner in a single pass of the carriage. A single pass is all that is needed for each document.

FIG. 7 shows a table illustrating differences between conventional scanning techniques and scanning according to an embodiment of the invention. In the first column 702, a list of features is presented. The second column 704 presents features associated with convention scanning of documents using a flatbed scanner. The third column 706 presents features associated with convention scanning of documents using a multi-functional scanner and printer (MFP). The fourth column 708 presents features associated with scanning of documents according to one implementation of the invention.

Some differences with respect to scanning by flatbed scanners and MFP's are now described. One difference is the number of passes of the carriage needed to scan documents. Only one pass 710 is needed for scanning multiple documents when a background is provided behind documents. In comparison, the carriage must be activated by flatbed scanners and MFP's according to known techniques and without the use of a background.

Another difference is that automatic cropping of all scanned documents 712 may be performed. This is different from traditional methods of scanning. In traditional cases, cropping does not execute at all or it must be executed manually with an associated computer and separate software or other programmatic element. According to the invention, cropping executes automatically and is facilitated by one or more of the features of the background behind the document or documents on the scanner. Automatic cropping may be performed by the scanner. One implementation of automatic cropping includes: identifying one or more features of the background, detecting the edges of each document in the image taken from the bed of the scanner, determining coordinates associated with the edges of each document and performing a cropping operation such as by saving each reduced area associated with a respective document as an electronic image or file. Automatic cropping may be performed with software, firmware or hardware instructions implemented in the MFP or scanner or through software, firmware or hardware instructions implemented on a computer associated with the MFP or scanner. Another difference is that automatic deskewing of all scanned documents 714 may be performed. This is different from traditional methods of scanning In traditional cases, automatic deskewing cannot be performed at all or deskewing must be executed manually. In the invention, deskewing executes automatically and is facilitated by one or more of the features of the background behind the document or documents on the scanner. One implementation of automatic deskewing includes: identifying one or more features of the background, detecting the edges of each document in the image taken from the bed of the scanner or determining a direction of elements in each document, determining a skew angle for each document, and performing a deskewing operation such as by rotating each image for a respective document according to the skew angle. A skew angle for a first document may be different from a skew angle for a second document when both the first document and second document are subjected to and present for a scan on a scanner because the first and second documents may independently be oriented on the scanner bed. Automatic deskewing may be performed with software, firmware or hardware instructions implemented in the MFP or scanner or through software, firmware or hardware instructions implemented on a computer associated with the MFP or scanner.

Another difference is that automatic optical character recognition (OCR) of scanned documents 716 may be performed. This is different from traditional methods of scanning In traditional cases, automatic OCR cannot be performed at all or OCR must be executed manually or in a separate stage subsequent to cropping or other operation. In the invention, OCR may be executed automatically and is facilitated by one or more of the features of the background behind the document or documents on the scanner. One implementation of automatic OCR includes: identifying one or more features of the background, detecting the edges of each document in the image taken from the bed of the scanner or determining a direction of elements in each document, and performing an OCR operation for each document based on detected edges or direction of elements in teach document. Automatic OCR may be performed with software, firmware or hardware instructions implemented in the MFP or scanner or through software, firmware or hardware instructions implemented on a computer associated with the MFP or scanner.

Another difference is that automatic file naming may be performed 718. The name provided for the particular document preferably includes one or more elements derived from the body or content of the particular document. This is different from traditional methods of scanning In traditional cases, automatic OCR cannot be performed at all or OCR must be executed manually. OCR is one source of elements that may be used to generate a name for the respective document or image. In the invention, automatic naming may be executed automatically and is facilitated by one or more of the features of the background behind the document or documents on the scanner. One implementation of automatic naming includes using text of features derived from performing OCR on the respective documents. Such implementation includes identifying one or more features of the background, determining a direction of elements in each document, performing an OCR operation for each document and generating a name for the respective documents based on the output of the OCR operation. Automatic naming may be performed with software, firmware or hardware instructions implemented in the MFP or scanner or through software, firmware or hardware instructions implemented on a computer associated with the MFP or scanner.

Gamma correction, deskew and image cleaning are optional operations. These operations can be performed for each document individually. In traditional cases, these operations usually are executed manually and cannot be automated. In one case, when an MFP is used, these operations can be executed automatically but are limited to performing these operations for all documents taken together in a single image. In the described invention, gamma correction, deskewing and image cleaning can execute automatically and can be performed for each document individually. Such may be performed with software, firmware or hardware instructions implemented in the MFP or scanner or through software, firmware or hardware instructions implemented on a computer associated with the MFP or scanner.

OCR, document classification and automated file name generation are optional operations. These operations can be performed for each document individually. In traditional, known methodologies, these operations must be executed manually. In the described invention, these operations are capable of executing automatically. A scanner or MFP may perform any of these operations with software, firmware or hardware instructions implemented in the MFP or scanner and may be triggered with a functional button selected at the start of an implementation of the invention.

Figure 8:
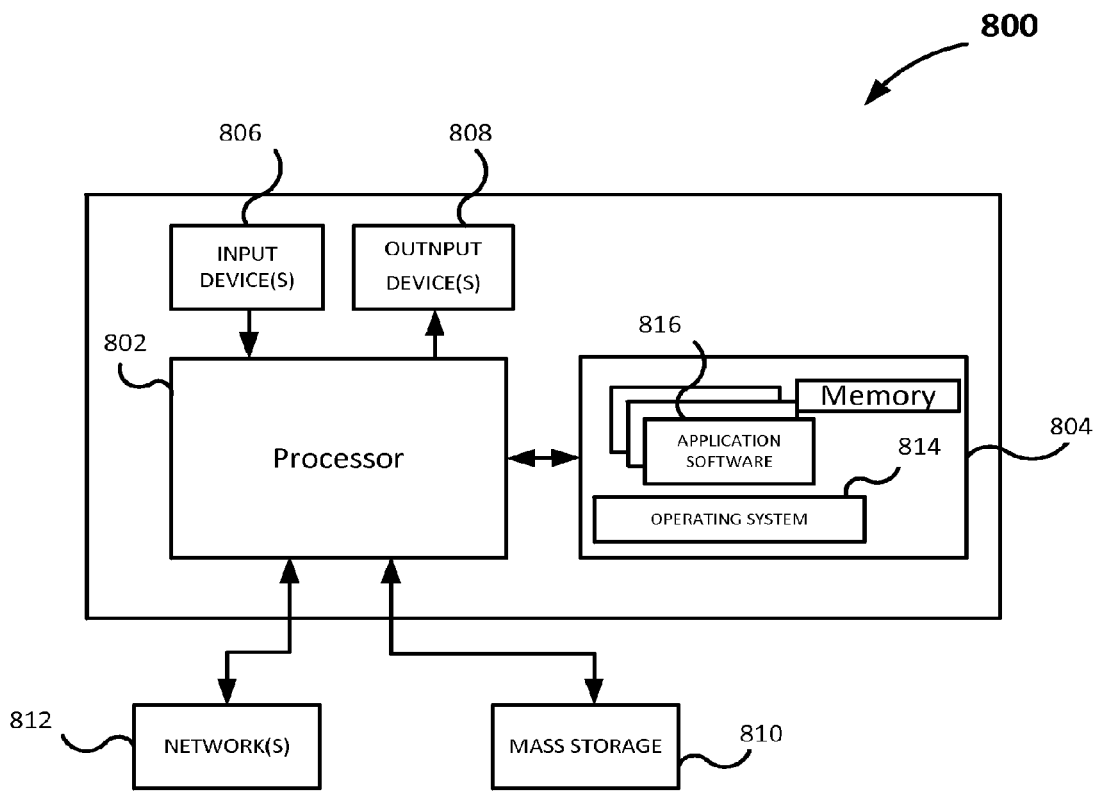
FIG. 8 shows exemplary hardware (computer) that may be associated with a scanner, hardware for implementing the disclosed procedures on an electronic device, in accordance with an embodiment of the present disclosure.

Referring now to FIG. 8, an example of hardware 800 that may be used to implement the techniques disclosed herein is shown, in accordance with an embodiment of the present disclosure. The hardware 800 typically includes at least one processor 802 coupled to a memory 804. The processor 802 may represent one or more processors (e.g., microprocessors), and the memory 804 may represent random access memory (RAM) devices comprising a main storage of the hardware 800, as well as any supplemental levels of memory e.g., cache memories, non-volatile or back-up memories (e.g. programmable or flash memories), read-only memories, etc. In addition, the memory 804 may be considered to include memory storage physically located elsewhere in the hardware 800, e.g. any cache memory in the processor 802, as well as any storage capacity used as a virtual memory, e.g., as stored on a mass storage device 810. The hardware 800 also typically receives a number of inputs and outputs for communicating information externally. For interface with a user or operator, the hardware 800 may include one or more user input devices 806 (e.g., a keyboard, a mouse, a scanner etc.) and a display 808 (e.g., a Liquid Crystal Display (LCD) panel). For additional storage, the hardware 800 may also include one or more mass storage devices 810, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 800 may include an interface with one or more networks 812 (e.g., a local area network (LAN), a wide area network (WAN), a wireless network, and/or the Internet among others) to permit the communication of information with other computers coupled to the networks. It should be appreciated that the hardware 800 typically includes suitable analog and/or digital interfaces between the processor 802 and each of the components 804, 806, 808 and 812 as is well known in the art.

The hardware 800 operates under the control of an operating system 814, and executes various computer software applications, components, programs, objects, modules, etc. indicated collectively by reference numeral 816 to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others.

Although the present invention has been described with reference to specific exemplary embodiments, it should be evident that the various modification and changes can be made to these embodiments without departing from the broader spirit of the invention. Further, one skilled in the art can practice the invention without the specific details provided.

Reference in this specification to "one embodiment" or "an embodiment" means that a particular feature, structure, or characteristic described in connection with the embodiment is included in at least one embodiment of the invention.

Appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. Accordingly, the specification and drawings are to be regarded in an illustrative sense rather than in a restrictive sense.

I claim:

1. A method for scanning a document, the method comprising:
    positioning a first document and a second document onto a bed of a scanner and under a pattern adjacent the bed of the scanner, the pattern being on top of the first document and the second document;
    generating a first image of the first document, the second document, and at least a portion of the pattern from a first pass of an imaging component of the scanner across the bed of the scanner;
    identifying a first document area and a second document area of the first image using the pattern;
    generating a second image of the first document area from a second pass of the imaging component of the scanner across at least a portion of the bed of the scanner; and
    generating a third image of the second document area from the second pass of the imaging component.

2. The method of claim 1, wherein the first pass is a forward pass, and wherein the second pass is a backward pass.

3. The method of claim 1, further comprising positioning a material with the pattern on the bed of the scanner and on top of the document.

4. The method of claim 1, wherein the second image is at a higher resolution than the first image.

5. The method of claim 1, further comprising:
    cropping the first image by selecting one or more portions of the first image, wherein generating the second image from the second pass of the imaging component comprises generating the second image using said cropping.

6. The method of claim 1, wherein identifying the first document area comprises cropping a portion of the first image.

7. The method of claim 1, wherein identifying the first document area comprises determining a skew angle from the first image and applying a skew correction to the second image based on the skew angle.

8. The method of claim 1, wherein the first document comprises two areas of content, and wherein identifying the first document area comprises determining the two areas of content.

9. The method of claim 1, further comprising: performing optical character recognition on a portion of the second image.

10. The method of claim 9, further comprising:
    extracting tags based on said optical character recognition of the second image;
    generating a file name based on the extracted tags; and
    saving the second image as an electronic file with the generated file name.

11. The method of claim 9, further comprising:
    defining a type associated with the first document using results obtained from the optical character recognition;
    forming a file name using the type; and
    saving an electronic file with the generated file name based on said second image.

12. A system for scanning a document comprising:
    a data processing apparatus; and
    a machine-readable storage device operatively coupled to the data processing apparatus and having instructions stored thereon configured to be executed by the data processing apparatus, wherein the data processing apparatus is configured to:
    position a first document and a second document onto a bed of a scanner and under a pattern adjacent the bed of the scanner, wherein the pattern is on top of the first document and the second document;
    generate a first image of the first document, the second document, and at least a portion of the pattern from a first pass of an imaging component of the scanner across the bed of the scanner;
    identify a first document area and a second document area of the first image based on the pattern;
    generate a second image of the first document area from a second pass of the imaging component of the scanner across at least a portion of the bed of the scanner; and
    generate a third image of the second document area from the second pass of the imaging component.

13. The system of claim 12, wherein the first pass is a forward pass, and wherein the second pass is a backward pass.

14. The system of claim 12, wherein the data processing apparatus is further configured to position a material with the pattern on the bed of the scanner and on top of the document.

15. The system of claim 12, wherein the second image is at a higher resolution than the first image.

16. The system of claim 12, wherein the data processing apparatus is further configured to:
    crop the first image into one or more portions, wherein the second image is generated from the second pass based on the one or more portions.

17. The system of claim 12, wherein the first document area corresponds to a first cropped portion of the first image.

18. The system of claim 12, wherein the data processing apparatus is further configured to determine a skew angle from the first image and apply a skew correction to the second image based on the skew angle.

19. The system of claim 12, wherein the first document comprises two areas of content, and wherein the first document area comprises the two areas of content.

20. The system of claim 12, wherein the data processing apparatus is further configured to:
    perform optical character recognition on a portion of the second image.

21. The system of claim 20, wherein the data processing apparatus is further configured to:
    extract tags based on said optical character recognition of the second image;
    generate a file name based on the extracted tags; and
    save the second image as an electronic file with the generated file name.

22. The system of claim 20, wherein the data processing apparatus is further configured to:
    define a type associated with the first document based on results obtained from the optical character recognition;
    form a file name based on the type; and
    save an electronic file with the file name based on said second image.

* * * * *